Dec. 2, 1947.  L. G. S. WOOD  2,431,854
APPARATUS FOR SUPPRESSING REVERBERATION
Filed Aug. 3, 1944
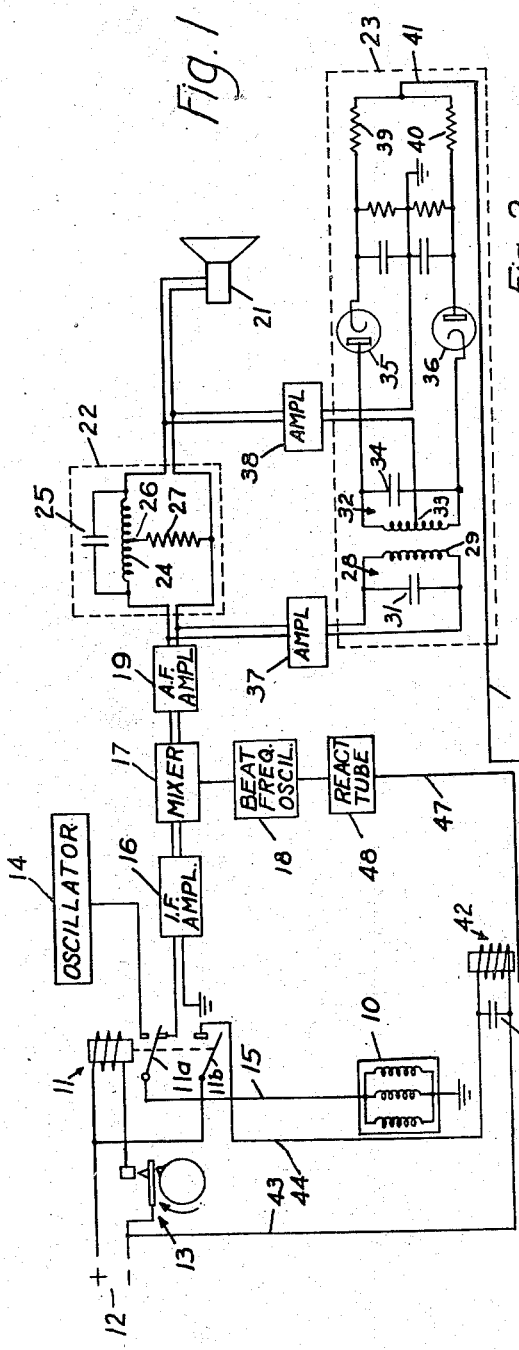
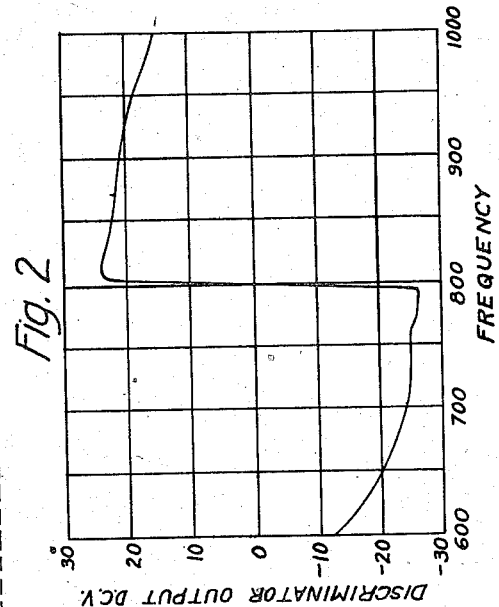
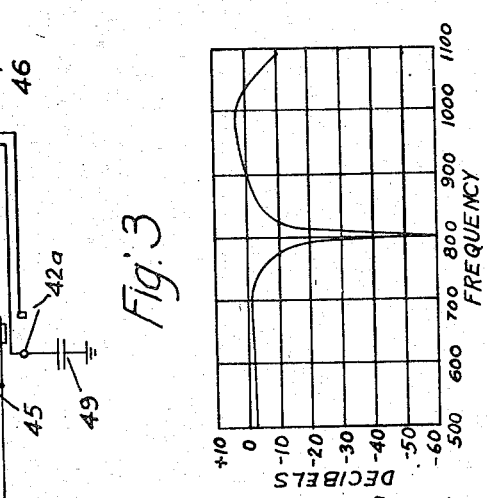
Inventor
LEON G. S. WOOD
W Glenn Jones
Attorney Patented Dec. 2, 1947

2,431,854

UNITED STATES PATENT OFFICE 2,431,854

APPARATUS FOR SUPPRESSING REVERBERATION

Leon G. S. Wood, Quincy, Mass., assignor to United States of America, as represented by the Secretary of the Navy Application August 3, 1944, Serial No. 547,919

5 Claims. (Cl. 177—386)

This invention relates to echo ranging apparatus mounted on a carrier and used for determining the direction and bearing of a target which the carrier is pursuing by the echo technique. One such type of apparatus usually includes an energy projector, a source of such energy such as an oscillator, and a receiver. The projector, mounted for rotation, is slowly trained around the horizon by an operator, stopping at about 10° intervals. At each interval, one or more energy pulses at the desired frequency are emitted from the projector. These pulses have directional or beam characteristics and, if intercepted by a target, will be returned to the projector as an echo. The echo pulse passes through the projector to the receiver where aural and/or visual indications of the echo pulse are produced. The bearing of the target relative to the carrier will be the same as the bearing of the projector at which the echo pulse was returned from the target and the range may be computed from the time required by the energy pulse to travel from the projector to the target and return therefrom.

More particularly, the invention relates to, and has for a general object, the provision of a novel arrangement for suppressing false or spurious echoes of the transmitted pulse as distinguished from a true echo from a moving target in order that the target echo may be detected with greater clarity.

The invention is of especial utility in underwater sound echo ranging and is described in this connection in the following specification. However, it should be expressly understood that it is equally applicable in conjunction with other types of echo ranging apparatus.

However, in the use of echo ranging apparatus, one of the chief difficulties encountered results from the fact that immediately following the transmission of an energy pulse, the receiver portion of the apparatus is connected in the system and spurious echoes, or reverberation, as distinguished from true target echoes, are received. If the pulse is long enough and of sufficient intensity to carry to and from the target with distinguishable intensity, the reverberation is, at times, very severe. Since an echo of the pulse from a true target may be relatively quite weak, the receiver must have enough gain to amplify it to readily recognizable levels. The high gain required tremendously amplifies the reverberation producing a blast of sound from the aural indicating means, such as a loudspeaker, which not only is very discomforting to the operator but also often so lowers his aural acuity as to make unrecognizable the subsequently following true target echo.

One specific object of the invention is therefore to provide a novel arrangement for suppressing spurious echoes due to reverberation of the underwater sound pulses from objects nearby the projector as distinguished from a true echo of the pulse from a more remotely located moving target.

In the use of echo ranging apparatus of the class described, when one or both the carrier of the apparatus such as a vessel and the pursued target are in motion, it will be evident that the echo pulse from the target will be shifted in frequency by an amount which is dependent upon the relative speed between the carrier and target in accordance with the well known Doppler principle. For example, in underwater echo ranging operation, when the frequency of the pulse transmitted from the projector is 20 kc., the shift in frequency is quite pronounced and amounts to approximately 14 cycles for each knot difference in speed between the pursuing vessel and the underwater target. This shift in frequency due to the Doppler effect can be and is used to indicate the relative speeds of the pursuing vessel and target.

In accordance with this invention, use is made of the Doppler effect to distinguish between echoes from a moving target and reverberation which latter also has a shift in frequency that varies with the speed of the pursuing vessel and the bearing at which the projector is trained relative to the vessel. Such shift in frequency has been termed "own Doppler" and the present invention is directed to a novel means to nullify it so that any Doppler shift detected in pulse echoes may be ascribed entirely to relative motion between the vessel and target.

Furthermore, with the "own Doppler" nullified so that reverberation is receivable as a signal of known, substantially constant frequency, a sharp filter which attenuates this frequency is then used to suppress the reverberation and make more readily distinguishable any echo which may be received from a moving target. This will be so because practically all echoes from the moving target will be Doppler shifted to a much greater extent than the reverberation and will, therefore, fall outside of the "notch" of, and thus be substantially unaffected by, the filter used to suppress the reverberation.

A more specific object of the invention is therefore to provide a novel arrangement for suppressing reverberation echoes in an echo ranging system installed on a moving carrier which arrangement includes a filter disposed in the receiver portion of the system which is tuned to sharply attenuate frequencies which correspond to a selected beat down frequency of the transmitted pulse, a discriminator for producing a voltage which is proportional to the departure, in frequency, of the reverberation echoes from the transmitted pulse, and means for applying this voltage to the reverberation echo signals in the receiver so as to change their frequency to that to which the filter is tuned whereby the reverberation echoes will be satisfactorily suppressed.

These and other objects of the invention will become more apparent from the following detailed description of a preferred embodiment of the invention and the accompanying drawings in which:

Fig. 1 is a diagrammatic view of one form of an echo ranging system embodying the invention;

Fig. 2 is a plot showing the change in output of the discriminator utilized as a function of frequency; and Fig. 3 is a plot showing the characteristics of the filter utilized in the system.

Referring now to Fig. 1, a conventional echo ranging apparatus is there shown as modified to include the present invention. A projector or transducer is designated at 10 and is adapted to be placed beneath the surface of the water with its active face in a substantially vertical position. The elements of the transducer are usually piezoelectric or magnetostrictive and are internally connected to act as a unit.

A relay 11, the winding of which is energized intermittently from a power source 12 through timer contactor 13, functions when energized to momentarily connect the output, at supersonic frequency, from transmitter oscillator 14 through its contacts 11a and via conductor 15 to the elements of projector 10. The electrical energy thus imparted to the projector elements, which is a pulse of comparatively short duration, causes a pulse of compressional wave energy to be projected through the water.

Projector 10 is of conventional construction, and its dimensions relative to the selected wave length of the energy pulse are such that the pulse is projected normal to its active face, the transmitting pattern having a single relatively sharp lobe with its maximum in the plane normal to this face.

After the pulse of energy is projected and relay 11 is deenergized, its contacts 11a open to thereby connect the elements of projector 10 to the receiver portion of the system. Thus the pulse echoes due to reverberation and that from the true target when received at the projector are converted into corresponding electrical energy pulses which feed over conductor 15 to an intermediate frequency amplifier 16, the output of which is beat to an audio frequency in a mixer 17, the beat-frequency oscillator being indicated at 18.

The resulting audio frequency signals are then amplified in an audio amplifier 19. With most of the underwater echo ranging apparatus currently employed, the output from amplifier 19 is at a frequency in the vicinity of 800 cycles/sec., so this will be considered as the standard in the further description of this invention.

In current apparatus, the output from amplifier 19 goes directly to either aural or visual indicators, or both. In the present embodiment however, only a loudspeaker 21 has been shown.

According to this invention, the above described receiver circuit is interrupted for the interposition of a filter shown within block 22 and a discriminator shown within block 23. While it is convenient to place these latter two units in the circuit in the positions shown, it may be desirable, in some instances, to place them elsewhere as, for example, between stages of audio frequency amplification, and such modification may be made readily so long as the input to the units is a modulated signal.

As shown in Fig. 1, the output signals from amplifier 19 are filtered in unit 22 which includes in one leg a reactance 24, bridged by a capacitance 25 and center tapped at 26 to connect to a resistance 27 which also connects to the opposite leg of the circuit. Such a device is called a "null T" bridge type filter and its constants are so selected that it possesses the characteristic of very sharply attenuating a signal of 800 cycles/sec. The filter curve is shown in Fig. 3, from which it will be seen that an 800 cycle wave is very greatly attenuated, but that a wave of say 780 or 820 cycles is lowered by only about ten decibels. The "notch" in the filter is purposely made narrow, because reverberation echoes (disregarding Doppler shift for the moment) are composed essentially of disturbances very closely centered around 800 cycles/sec. With Doppler shift present, reverberation is represented by essentially 800 cycles plus the Doppler shift, which may add to or subtract from the frequency of the transmitted pulse depending on whether the projector 10 is trained in the same direction that its carrier vessel is moving, or in the opposite direction.

The output voltage of the filter unit 22, employed to suppress reverberation, undergoes rapid phase changes near the null point and can thus be made to act as a very high Q discriminator of voltages about 800 cycles/sec. Filter unit 22, however, is not effective over a sufficient frequency range, so there is combined with it the discriminator unit 23 which has a much broader deviation sensitivity.

Any conventional discriminator can be used, but the specific example shown and described herein has been found to operate most successfully.

Discriminator 23 includes a primary resonant circuit 28 including inductance 29 bridged by a capacitance 31 and inductively coupled to a secondary resonant circuit 32 which includes a center tapped inductance 33 and parallel connected capacitance 34, the two ends of which are connected to the anode and cathode elements of diode rectifiers 35 and 36. It will be noted that rectifiers 35 and 36 are connected so that their outputs are of opposite polarity, with one end of inductance 33 being connected to the anode of rectifier 35 and the other end thereof connected to the cathode of rectifier 36.

Connection between the resonant primary circuit 28 and the output of amplifier 19 is made, if desired, through amplifier 37 ahead of filter unit 22 and connection between the center tap of the resonant secondary circuit 32 is made to the output of amplifier 19 through amplifier 38 after filter unit 22.

As previously stated, each end of the resonant secondary circuit 32 terminates in diode rectifiers 35, 36, respectively, which in turn through suitable resistors 39 and 40, feed the D. C. output 41. When the input is at its resonant frequency, equal and opposite voltages are set up across resistors 39 and 40 and the D. C. output is zero. When, however, the signal frequency changes due to Doppler shift, one of the diode voltages increases while the other decreases and a voltage equal to the difference between the voltages across resistors 39 and 40 appears at the output 41. The sign of this voltage will of course depend upon whether the signal is greater or less than the resonant frequency and, for frequencies close to 800 cycles/sec., its magnitude will depend upon the disparity. Fig. 2 shows the characteristic curve of the discriminator 23 with output D. C. voltage plotted against frequency.

A relay 42 is provided and is energized from the power source 12 over conductors 43, 44 upon closure of contacts 11b of relay 11. The energizing winding of relay 42 includes a capacitor 45 to delay opening of its contacts 42a when the relay winding is disconnected from source 12 as relay contacts 11b open, this delay being provided for a purpose which be explained hereinafter.

The D. C. output 41 from discriminator 23 feeds over conductor 46, through relay contacts 42a, when closed, and over conductor 47 to the grid of a reactance tube 48 which is a component part of the beat frequency oscillator 18, but which is shown apart therefrom for purposes of explanation. As is well known in the art, the grid voltage of reactance tube 48 determines the output frequency of oscillator 18.

Also connected in circuit with the D. C. output 41 through relay contacts 42a is a capacitor 49 which is charged when relay 42 is energized and its contacts 42a are closed. Capacitor 49 serves to hold the D. C. output potential on the grid of reactance tube 48 when relay contacts 42a open, thus resetting or correcting oscillator 18 at each transmission of a pulse.

When relay 11 is deenergized, its contacts 11a connect transducer 10 to the receiver portion of the apparatus. Thus the immediately following reverberation will start through the receiver circuit and the discriminator 23 will produce a D. C. output proportional thereto. Due to the delaying action of capacitor 45, relay contacts 42a are delayed in opening, and thus for a short period the D. C. output from discriminator 23 will be applied through relay contacts 42a to the grid of the reactance tube 48. Thus the reverberation entering the receiver circuit is "sampled" during the period that relay contacts 42a are closed after relay contacts 11a open, which period is so selected as to correspond to the period required for reverberation echoes from the transmitted compressional wave energy pulse to return to the transducer 10 from about thirty to fifty yards in the water, although longer "sampling" periods can, and have been, successfully employed.

Operation

The apparatus described operates in the following manner:

When an energy pulse is sent out from transducer 10, the contacts of relays 11 and 42 are closed and capacitor 45 is charged. Relay contacts 11a are opened at the end of the pulse which occurs when the winding of relay 11 is disconnected from source 12, but relay contacts 42a are held closed by the action of capacitor 45 during a short, predetermined period thereafter. Assuming for example that transducer 10 is trained forwardly of the carrier thereof, the reverberation which follows immediately and starts through the receiver will be shifted upward in frequency due to the Doppler effect caused by the carrier vessel's own motion so that the output of amplifier 19 due to reverberation will be at a frequency slightly greater than 800 cycles/sec. Discriminator 23 thus develops a D. C. output voltage which passes through the closed relay contacts 42a and charges capacitor 49 and is, at the same time, impressed upon the grid of reactance tube 48. Tube 48 operates in the usual manner to alter the output frequency of oscillator 18, increasing its frequency to such an extent that the output of the audio frequency amplifier 19 is brought back to 800 cycles/sec.

Since reverberation is manifest now as a sound of predominantly 800 cycles/sec. from amplifier 19, the reverberation suppression filter 22 operates to attenuate it to an inconsequential amount.

The charge on the grid of the reactance tube 48 is maintained at a constant level by capacitor 49 until the next pulse, at which time it may be altered depending on whether the Doppler shift in the reverberation echoes is greater or less than on the previously transmitted pulse.

The subsequently following true target echo which has a Doppler shift therein different than the reverberation echoes due to motion of the target, and is thus not affected by the action of filter 22, can now be distinguished clearly because of the low level to which the reverberation echoes have been attenuated, and because its tone is different than the tone of the reverberation.

The device has been found exceedingly effective in suppressing reverberation and, only in the rare case of a target and searching vessel on which the transducer 10 is carried having corresponding speeds in the same direction, plus or minus one knot, will the true target echo fall in the 800 cycle "notch" of filter 22 so that it too would be attenuated.

In conclusion, I desire it to be expressly understood that the foregoing description of this invention concerns only the preferred embodiment thereof and that accordingly changes and modifications may be made therein by those skilled in the art without departing from the spirit and scope of the invention as defined in the appended claims.

Having thus fully described my invention, I claim:

1. In an echo ranging system adapted to be installed on a moving carrier, said system including a transmitter for emitting pulses of wave energy and a receiver for detecting pulse echoes, means for suppressing reverberation echoes as distinguished from a true echo from a moving target comprising, means for sampling the initial reverberation echoes in said receiver to derive therefrom a potential variable as the departure of the frequency of the sampled reverberation from a selected frequency related to the frequency of the emitted pulses, means in said receiver utilizing said potential to nullify such shift in frequency of the remainder of the reverberation echoes, and sharply tuned filter means for attenuating echoes at said selected frequency.

2. In an echo ranging system adapted to be installed on a moving carrier, said system including a transmitter for emitting pulses of wave energy and a receiver for detecting pulse echoes, means in said receiver for suppressing reverberation as distinguished from a true echo from a moving target, said means comprising; means for sampling the initial reverberation in said receiver, a mixer through which all pulse echoes are passed, a beat frequency oscillator connected to said mixer, the output frequency of said oscillator being normally set to produce at the mixer output a selected frequency related to the frequency of the emitted pulse, means for shifting the output frequency of said oscillator in accordance with the shift in frequency of the sampled reverberation from the frequency of the emitted pulse whereby the remainder of the reverberation which follows will appear at the output of said mixer at said selected frequency, and sharply tuned filter means for attenuating pulse echoes at said selected frequency.

3. In an echo ranging system adapted to be installed on a moving carrier, said system including a transmitter for emitting pulses of wave energy and a receiver for detecting pulse echoes, means in said receiver for suppressing reverberation as distinguished from a true echo from a moving target, said means comprising; a mixer through which all pulse echoes are passed, a beat frequency oscillator connected to said mixer, the frequency control means of said oscillator being potential responsive and normally set to produce at the mixer output a selected frequency related to the frequency of the emitted pulse, a discriminator for deriving a potential proportional to the shift in frequency of the initially received reverberation from the frequency of the emitted pulse, said potential being applied to the frequency control means of said oscillator to correspondingly shift the output frequency thereof whereby the remainder of the reverberation which follows will appear at the output of said mixer at said selected frequency, and sharply tuned filter means for attenuating pulse echoes at said selected frequency.

4. In an echo ranging system adapted to be installed on a moving carrier, said system including a pulse oscillator, a pulse projector, a receiver for detecting pulse echoes, and a first relay for alternately connecting said projector to said pulse oscillator and receiver, means in said receiver for suppressing reverberation as distinguished from a true echo from a moving target, said means comprising; a mixer through which all pulse echoes are passed, a beat frequency oscillator connected to said mixer, the output frequency control means of said beat oscillator being potential responsive and normally set to produce at the mixer output a selected frequency related to the frequency of the emitted pulse, a discriminator for deriving an output potential proportional to the shift in frequency of the initially received reverberation from the frequency of the emitted pulse, a second relay energized with said first relay, means to delay the opening of the contacts of said second relay for a preselected period following opening of the contacts of said first relay, circuit means connecting said discriminator output potential through the contacts of said second relay when closed to the frequency control means of said beat oscillator to thereby shift the output frequency of said beat oscillator by an amount sufficient to nullify at the mixer output the shift in frequency of the remainder of the reverberation whereby the latter will be at said selected frequency, and sharply tuned filter means connected to the mixer output for attenuating pulse echoes at said selected frequency.

5. The combination in claim 4 and further including a capacitor adapted to be charged to the discriminator output potential, and circuit means connecting said capacitor to the potential responsive element of said beat oscillator frequency control means.

LEON G. S. WOOD.

REFERENCES CITED

The following references are of record in the file of this patent:

UNITED STATES PATENTS

| Number | Name | Date |
|---|---|---|
| 2,033,160 | Turner | Mar. 10, 1936 |
| 2,166,991 | Guanella | July 25, 1939 |
| 2,308,390 | Ritzmann | Jan. 12, 1943 |
| 2,355,826 | Sharpe | Aug. 15, 1944 |